United States Patent [19]

Shekleton

[11] Patent Number: 5,187,932
[45] Date of Patent: Feb. 23, 1993

[54] STORED ENERGY COMBUSTOR

[75] Inventor: Jack R. Shekleton, San Diego, Calif.

[73] Assignee: Sundstrand Corporation, Rockford, Ill.

[21] Appl. No.: 615,052

[22] Filed: Nov. 19, 1990

[51] Int. Cl.[5] .................................................. F23R 3/54
[52] U.S. Cl. ........................................ 60/39.23; 60/760
[58] Field of Search ................... 60/760, 39.142, 39.23, 60/39.29, 266; 431/158, 187, 188, 165

[56] References Cited

U.S. PATENT DOCUMENTS

| 2,641,904 | 6/1953 | Bouffart. | |
|---|---|---|---|
| 2,741,085 | 4/1956 | Prentiss. | |
| 3,608,309 | 9/1971 | Hill et al.. | |
| 3,742,702 | 7/1973 | Quinn. | |
| 4,018,043 | 4/1977 | Clemmens | 60/39.23 |
| 4,201,047 | 5/1980 | Warren et al. | 60/760 |
| 4,351,156 | 9/1982 | White et al. | 60/760 |
| 4,549,402 | 10/1985 | Saintsbury et al.. | |
| 4,955,202 | 9/1990 | Shekleton et al. | 60/760 |

FOREIGN PATENT DOCUMENTS

| 1163762 | 9/1958 | France | 60/768 |
|---|---|---|---|
| 401868 | 11/1933 | United Kingdom | 60/39.23 |
| 947134 | 1/1964 | United Kingdom | 60/760 |

Primary Examiner—Richard A. Bertsch
Assistant Examiner—Timothy S. Thorpe
Attorney, Agent, or Firm—Wood, Phillips, Van Santen, Hoffman & Ertel

[57] ABSTRACT

To control cooling by oxidant surrounding a combustion chamber (20, 20'), a stored energy combustor (10, 10') includes an oxidant flow path (28) which extends about the combustion chamber (20, 20'). The stored energy combustor (10, 10') comprises a vessel (12, 12') having a wall (14, 14') defining spaced inlet and outlet ends (16 and 18) interconnected by the combustion chamber (20, 20'), an oxidant inlet port (22) upstream of the combustion chamber (20, 20') for directing oxidant thereinto, and a fuel injector (24) upstream of the combustion chamber (20, 20') for directing fuel thereinto. A housing (26) substantially surrounds the vessel (12, 12') in spaced relation to the wall (14, 14') from the inlet end (16) to the outlet end (18) whereby the housing (26) and wall (14, 14') define the oxidant flow path (28) therebetween which is in communication with the oxidant inlet port (22) upstream of the combustion chamber (20, 20'). The stored energy combustor (10, 10') also includes a tube (32) leading from a source of oxidant into the oxidant flow path (28) at a point adjacent the outlet end (18) of the vessel (12, 12') to direct oxidant into the oxidant flow path (28) so as to have a substantial tangential velocity component as it flows from the outlet end (18) to the inlet end (16) of the vessel (12, 12') and into the oxidant inlet port (22). With this arrangement, the stored energy combustor (10, 10') further includes a valve (38) operatively associated with the tube (32) for controlling the velocity of the oxidant entering the oxidant flow path (28) adjacent the outlet end (18) of the vessel (12, 12') dependent upon operating conditions whereby the valve (38) decreases velocity by opening to increase the cross-sectional area of the tube (32) and increases velocity by closing to decrease the cross-sectional area of the tube (32).

20 Claims, 2 Drawing Sheets

STORED ENERGY COMBUSTOR

FIELD OF THE INVENTION

The present invention is generally related to stored energy combustors and, more particularly, stored energy combustors which utilize oxidant for combustor cooling purposes.

BACKGROUND OF THE INVENTION

In many stored energy combustors, air consumption grossly exceeds desirable levels which can often be attributed to high combustion inefficiency. This is typically due to heat loss from the flame to cold combustor walls, and it is further exacerbated by very low blow down air temperature entering the flame as flow which may reach, e.g., $-190°$ F. Still further, the problem is complicated by the high heat loss to the combustor wall because of the typically short transient running time.

In addition, these high heat losses are known to cause the buildup of carbon which can result in plugged turbine nozzles. This carbon build-up thereby can prevent reliable turbine operation. In order to avoid these heat losses, it is now known that a generally spherically-shaped combustor is an advantageous arrangement.

In this connection, a generally spherically-shaped combustor is well suited to minimize the mass of metal adjacent the flame to thereby minimize the detrimental thermal inertia effect. Furthermore, the surface/volume is minimized and hence steady state heat loss can also be minimized which further demonstrates the advantages of the spherical shape. As a further improvement, the use of a thin combustor wall liner has previously been disclosed in commonly owned, copending patent application U.S. Ser. Nos. 324,806 and 447,654, filed Mar. 17, 1989 and Dec. 8, 1989, now U.S. Pat. Nos. 4,955,202 and 5,024,058, issued Sep. 11, 1990, and Jun. 18, 1991, respectively.

In this earlier patent application, the thin combustor wall liner is provided immediately adjacent the combustion chamber inner wall. After ignition, the oxidant cooling path about the combustion chamber is thermally isolated from the thin combustor wall liner by a gap between the liner and the combustion chamber wall such that, during warmup, the liner is not cooled. Hence, since the combustor wall liner is thin and uncooled, the liner is able to heat up very quickly.

Being unstressed and formed of a suitable high temperature material, the liner can be operated at very high temperatures on the order of 1900° F. Furthermore, as the liner is heated, it expands to close the gap between the liner and the combustion chamber wall to permit the liner to then be cooled by the oxidant cooling path about the combustion chamber. As a further advantage, the oxidant cooling path permits significant heat input into the oxidant prior to introduction into the combustion chamber once the liner is heated.

While this represents a most significant advancement in the field, it may not be desirable in every instance to utilize a liner in a stored energy combustor. It is nonetheless important that the hottest practical combustor wall temperature and the fastest possible warmup be achieved in order to minimize undesirable combustion inefficiencies, i.e., free carbon and oxygen, while permitting very fuel rich operation. Thus, where the thermal transient becomes critical, it is important to have some means of variable heat transfer to and from the combustor wall.

The present invention is directed to overcoming one or more of the foregoing problems and achieving one or more of the resulting objects.

SUMMARY OF THE INVENTION

It is a principal object of the present invention to provide an improved stored energy combustor. It is a further object of the present invention to provide a stored energy combustor which accommodates variable heat transfer to the combustor walls by means of varying oxidant velocity and controlling oxidant direction into an oxidant flow path about a combustion chamber. It is an additional object of the present invention to vary oxidant velocity dependent upon operating conditions.

Accordingly, the present invention is directed to a stored energy combustor comprising a vessel having a wall defining spaced apart inlet and outlet ends interconnected by a combustion chamber, an oxidant inlet port upstream of the combustion chamber for directing oxidant into the combustion chamber, and fuel injection means upstream of the combustion chamber for directing fuel into the combustion chamber. A housing substantially surrounds the vessel in spaced relation to the wall from the inlet end to the outlet end whereby the housing and wall together define an oxidant flow path therebetween which is in communication with the oxidant inlet port upstream of the combustion chamber. Additionally, the stored energy combustor includes means for directing oxidant from a source into the oxidant flow path at a point adjacent the outlet end of the vessel in a manner having a substantial tangential velocity component as it flows from the outlet end to the inlet end of the vessel into the oxidant inlet port.

With these features, the exemplary embodiment includes means for controlling the velocity of the oxidant entering the oxidant flow path adjacent the outlet end of the vessel dependent upon operating conditions. Preferably, the velocity controlling means includes a valve operatively associated with the oxidant directing means, the latter of which comprises a tube leading from the source of oxidant to the housing and having a discharge end communicating with the housing. With this arrangement, the valve advantageously cooperates with the discharge end of the tube to control both the velocity and direction of oxidant entering the oxidant flow path.

In a highly preferred embodiment, the stored energy combustor includes means for swirling the oxidant at the oxidant inlet port so as to direct oxidant in a swirling annulus into the combustion chamber. The tangential velocity component of the oxidant in the oxidant flow path is also such as to cause the oxidant to flow in a swirling annulus from the outlet end toward the inlet end of the vessel. Preferably, the swirling annulus produced by the tangential velocity component of the oxidant in the oxidant flow path has generally the same direction of swirl as the swirling annulus produced by the oxidant swirling means.

In a most highly preferred embodiment, the tube leading from the source of oxidant to the housing has its discharge end arranged generally tangentially of the housing at a point radially outwardly of a longitudinal axis of the vessel. The tube is arranged so as to direct oxidant from the source into the housing in such manner as to cause the oxidant flow path to be generally helical. Still further, the stored energy combustor preferably includes a plurality of generally tangentially extending trip strips on an outer surface of the wall defining the vessel and the valve operates by varying the cross-sectional area of the tube at or upstream of the discharge end of the tube.

Other objects, advantages and features of the present invention will become apparent from a consideration of the following specification taken in conjunction with the accompanying drawings.

DETAILED DESCRIPTION OF THE PREFERRED EMBODIMENTS

Figure 1:
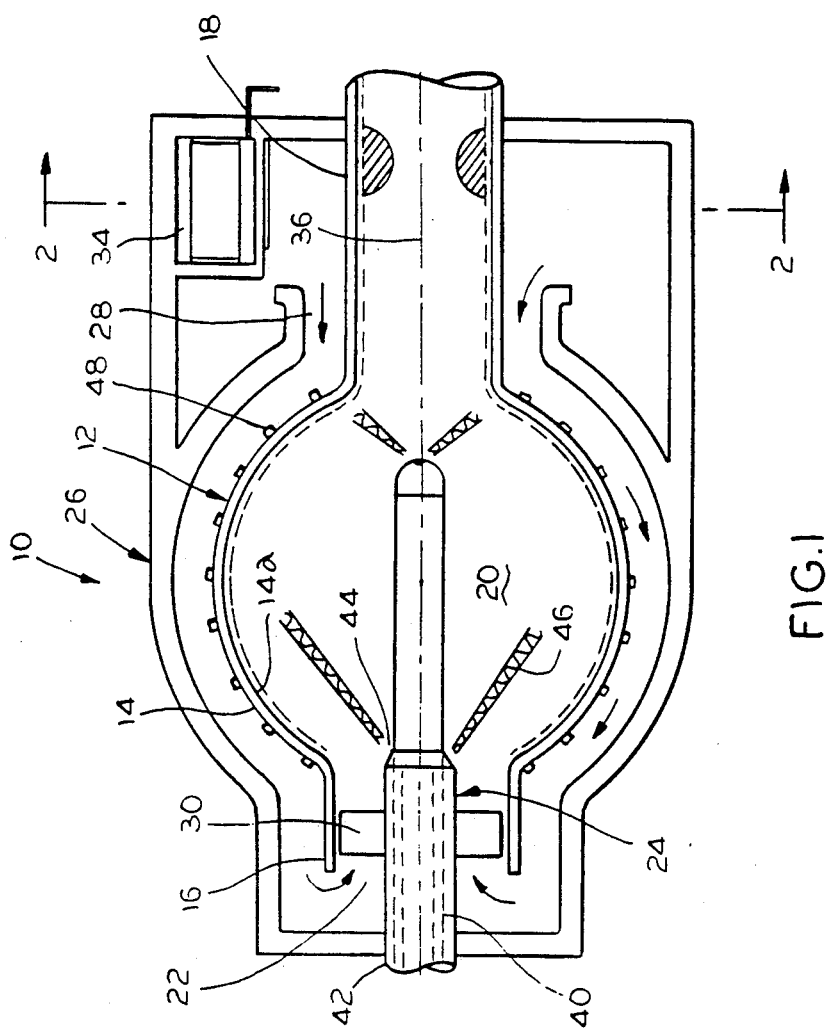
FIG. 1 is a partially schematic cross-sectional view illustrating a stored energy combustor in accordance with the present invention.

Referring to the drawings, and first to FIG. 1, the reference numeral 10 designates generally a stored energy combustor in accordance with the present invention. The stored energy combustor 10 comprises a vessel generally designated 12 having a wall 14 defining spaced apart inlet and outlet ends 16 and 18 interconnected by a combustion chamber 20, an oxidant inlet port 22 upstream of the combustion chamber 20 for directing oxidant into the combustion chamber 20, and fuel injection means 24 upstream of the combustion chamber 20 for directing fuel into the combustion chamber 20. A housing generally designated 26 substantially surrounds the vessel 12 in spaced relation to the wall 14 from the inlet end 16 to the outlet end 18 such that the housing 26 and wall 14 together define an oxidant flow path 28 therebetween which is in communication with the oxidant inlet port 22 upstream of the combustion chamber 20. The stored energy combustor 10 also includes means for directing oxidant from a source (not shown) into the oxidant flow path 28 at a point adjacent the outlet end 18 of the vessel 12 so as to have a substantial tangential velocity component as it flow from the outlet end 18 to the inlet end 16 of the vessel 12 and into the oxidant inlet port 22. Still additionally, the stored energy combustor 10 includes means for controlling the velocity of the oxidant entering the oxidant flow path 28 adjacent the outlet end 18 of the vessel 12 dependent upon operating conditions.

Still referring to FIG. 1, the stored energy combustor 10 includes means for swirling the oxidant such as swirl blades 30 at the oxidant inlet port 22 so as to direct oxidant in a swirling annulus into the combustion chamber 20. The tangential velocity component of the oxidant in the oxidant flow path 28 also causes the oxidant to flow in a swirling annulus from the outlet end 18 toward the inlet end 16 of the vessel 12. In this connection, the swirling annulus produced by the tangential velocity component of the oxidant in the oxidant flow path 28 advantageously has generally the same direction of swirl as the swirling annulus produced by the swirl blades 30.

Figure 2:
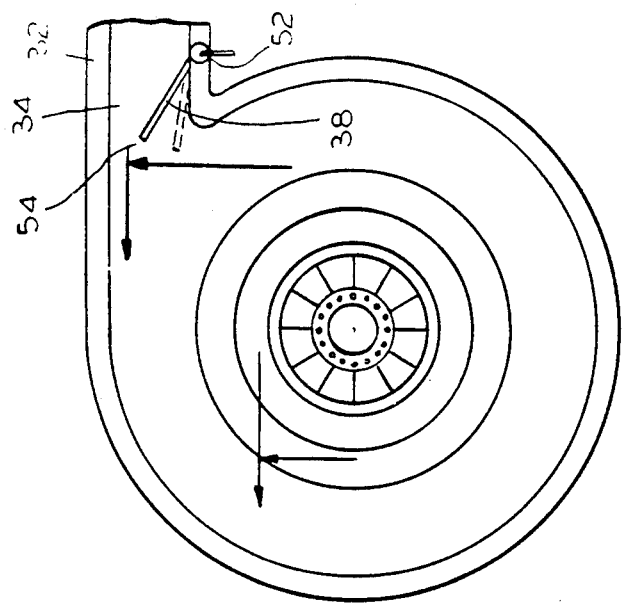
FIG. 2 is a cross-sectional view taken on the line 2—2 of FIG. 1.

Referring now to FIGS. 1 and 2, the oxidant directing means preferably includes a tube 32 leading from the source of oxidant to the housing 26. The tube 32 has a discharge end 34 arranged generally tangentially of the housing 26 at a point radially outwardly of a longitudinal axis 36 of the vessel 12. As will be appreciated, the tube 32 directs oxidant from the source into the housing 26 in such manner as to cause the oxidant flow path to be generally helical.

As also shown in FIGS. 1 and 2, the velocity controlling means includes a valve 38 operatively associated with the tube 32. In the illustrated embodiment, the valve 38 comprises a flapper valve adapted to vary the cross-sectional area of the tube 32 at or upstream of the discharge end 34 of the tube 32 whereby, when the source of oxidant is provided at a preselected pressure, the valve 38 decreases velocity by opening (as shown in phantom lines in FIG. 2) to increase the cross-sectional area and increases velocity by closing (as shown in solid lines in FIG. 2) to decrease the cross-sectional area at or upstream of the discharge end 34 of the tube 32. In this connection, the valve 38 cooperates with the discharge end 34 of the tube 32 to control both the velocity and direction of oxidant entering the oxidant flow path.

Still referring to FIGS. 1 and 2, the wall 12 defines narrow, spaced apart inlet and outlet ends 16 and 18 interconnected by a relatively wide combustion chamber 20. The longitudinal axis 36 is seen to extend from the inlet end 16 through the combustion chamber 20 to the outlet end 18 thereof and the inlet end 16 and outlet end 18 are seen to be generally tubular extensions of the vessel 12 leading to and from the combustion chamber 20. Additionally, the oxidant inlet port 22 is seen to be generally concentric with the longitudinal axis 36 of the vessel 12 at the inlet end 16 thereof.

As will also be appreciated, the fuel injection means 24 is disposed in the tubular extension 16 of the vessel 12 leading to the combustion chamber 20. The fuel injection means or fuel injector 24 includes a tube 40 defining a fuel passageway 42 extending in generally concentric relation to the longitudinal axis 36 of the vessel 12 to a discharge end 44 for directing fuel from a source (not shown) into the combustion chamber 20 substantially as shown in a generally conical spray as at 46, the discharge end 44 of the fuel injector 24 also being concentric with the longitudinal axis 36 of the vessel 12. As will be seen, the tubular extension 16 leading to the combustion chamber 20 directs oxidant into the combustion chamber 20 outwardly of the fuel passageway 42 defined by the tube 40 at the discharge end 44 thereof.

As previously mentioned, the stored energy combustor 10 includes swirl blades 30 which are seen to be upstream of the combustion chamber 20 and upstream of the discharge end 44 of the fuel injector 24. The swirl blades 30 are thus adapted to swirl the oxidant in the tubular extension 16 of the vessel 12 at a point upstream of and leading to the combustion chamber 20. As a result, the tubular extension 16 is adapted to direct oxidant in a swirling annulus into the combustion chamber 20 to intersect the conical annulus of fuel 46 outwardly of the discharge end 44 of the fuel injector 24.

Still referring to FIGS. 1 and 2, the tube 32 has its discharge end 34 in communication with the oxidant flow path 28 at substantially the radially outermost extent of the housing 26 in the illustrated embodiment. It will also be seen that a plurality of trip strips 48 may advantageously be provided on an outer surface of the wall 14 defining the vessel 12 at least in the region of the combustor 20 so as to facilitate cooling and, as shown, the trip strips 48 are preferably disposed about the wall 14 in the region of the combustor 20 substantially in the direction of flow of oxidant in the oxidant flow path 28, i.e., generally helically. In addition, the valve 38 will be seen to control the flow of oxidant from the source into the oxidant flow path at or upstream of the discharge end 34 thereof.

In order to further enhance the operability of the stored energy combustor 10, the wall surface as at 14a in the region of the combustion chamber 20 may have a thermal barrier coating. This thermal barrier coating on the inner surface 14a of the wall 14 in the region of the combustion chamber 20 will serve the purpose of permitting initial rapid elevation of temperature to a desired level followed by steady state cooling in conjunction with the operation of the valve 38 and discharge end 34 of the tube 32 as previously described. As mentioned hereinabove, the tube 32 may advantageously have its discharge end 34 positioned at the outer periphery of the housing 26.

As will be appreciated from FIGS. 1 and 2, the combustion chamber 20 is generally spherical in shape. It is believed that this is a highly advantageous shape for the reasons that have been mentioned hereinabove in terms of combustor performance, stress factors, cooling factors, and the like. Alternatively, a stored energy combustor 10' may be utilized as illustrated in FIGS. 3 and 4.

Figure 4:
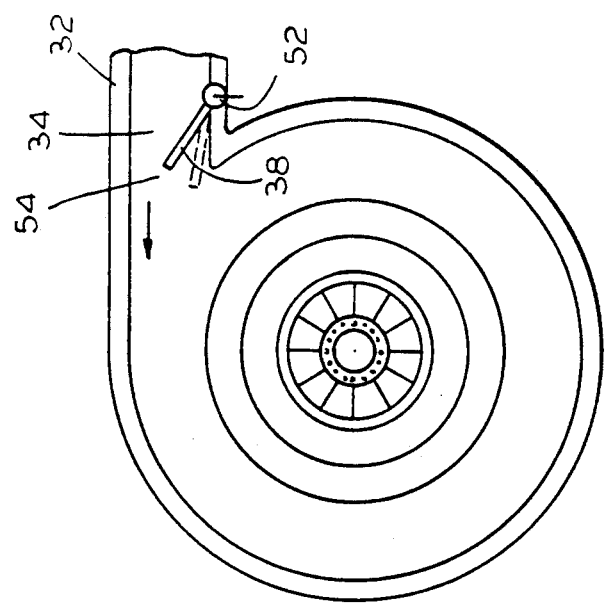
FIG. 4 is a cross-sectional view taken on the line 4—4 of FIG. 3.
Figure 3:
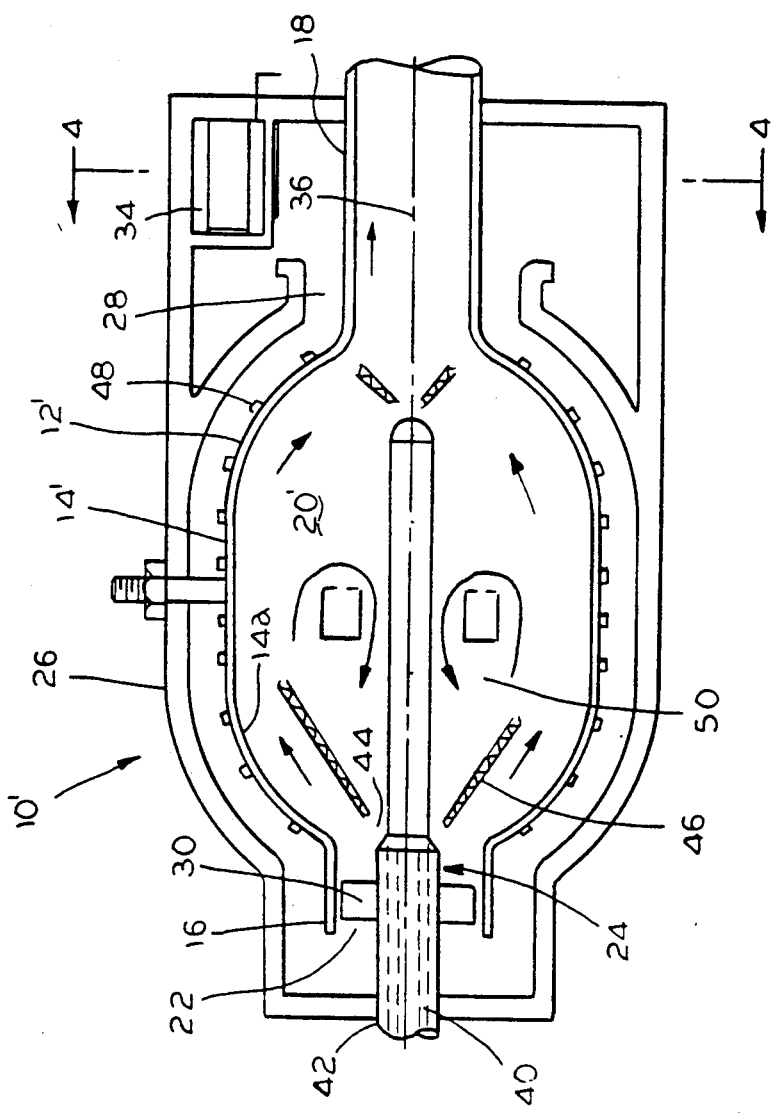
FIG. 3 is a partially schematic cross-sectional view of another embodiment in accordance with the present invention.

Referring to FIGS. 3 and 4, the stored energy combustor 10' has many components substantially identical to those in the embodiment illustrated in FIGS. 1 and 2. These components have all been designated by like reference numerals. As for the differences, the vessel 12' has an elongated wall 14' defining a combustion chamber 20' which is generally oblong in shape.

In this connection, the stored energy combustor 10' retains most if not all of the advantages of the stored energy combustor 10. The extended length of the combustion chamber 20' is, however, particularly advantageous in facilitating ignition when using a swirl stabilized flame substantially as shown. As illustrated in FIG. 3, the extended length of the combustion chamber 20' extends the recirculation zone as at 50 which has been found to be advantageous for ignition purposes.

As will be appreciated, the valve 38 may suitably be mounted on a shaft 52 and may be actuated by any appropriate means. This permits a variation in the gap 54 between the valve 38 and the side of the tube 32 opposite the shaft 52 over a wide range and thus, with a fixed mass flow exiting the turbine nozzle (not shown) at the outlet end 18, the velocity through the gap 54 may be varied over a wide range. Likewise, the velocity in the oxidant flow path 28, which comprises a cooling flow path, can be varied as a result.

At ignition and immediately afterwards, the valve 38 is typically wide open substantially as shown in phantom lines in FIG. 1. The velocity through the gap 54 is thus minimized and, therefore, immediately after ignition, the tangential velocity is low which means that cooling of the wall 14 or 14' is also low. When the walls 14 or 14' has reached a desired temperature, the valve 38 will close somewhat for increased velocity and enhanced cooling.

As previously mentioned, the trip strips 48 can be judiciously located on the wall 14 or 14' by any suitable means. This will give good thermal contact to the wall, particularly where the trip strips 48 are secured as by brazing or the like. With the trip strips 48, the temperature of the wall 14 or 14' can be optimized to a hot highly uniform level.

As will be appreciated, modulation of the valve 38 can be accomplished by a variety of different means including a valve control system tied to a variety of different parameters. These may include time, measurement of the temperature of the wall 14 or 14', measurement of air temperature entering the swirl blades 30, etc. Also, while shown in the illustrated embodiment, the discharge end 34 of the tube 32 need not necessarily be at the outer periphery nor need it necessarily be entirely tangential.

While in the foregoing there have been set forth preferred embodiments of the invention, it will be appreciated that the details herein given may be varied by those skilled in the art without departing from the true spirit and scope of the appended claims.

I claim:

1. A stored energy combustor, comprising:
   a vessel having a wall defining spaced apart inlet and outlet ends interconnected by a combustion chamber;
   an oxidant inlet port upstream of said combustion chamber for directing oxidant into said combustion chamber;
   fuel injection means upstream of said combustion chamber for directing fuel into said combustion chamber;
   a housing substantially surrounding said vessel in spaced relation to said wall from said inlet end to said outlet end, said housing and said wall defining an oxidant flow path therebetween, said oxidant flow path being in communication with said oxidant inlet port upstream of said combustion chamber; and
   means for directing oxidant from a source into said oxidant flow path at a point adjacent said outlet end of said vessel, said oxidant directing means being adapted to direct all of said oxidant into said oxidant flow path so as to have a substantial tangential velocity component as all of said oxidant flows from said outlet end to said inlet end of said vessel and into said oxidant inlet port, and including means for controlling the velocity of said oxidant entering said oxidant flow path adjacent said outlet end of said vessel dependent upon operating conditions.

2. The stored energy combustor of claim 1 including means for swirling said oxidant at said oxidant inlet port so as to direct oxidant in a swirling annulus into said combustion chamber, said tangential velocity component of said oxidant in said oxidant flow path causing said oxidant to flow in a swirling annulus from said outlet end toward said inlet end of said vessel upstream of said oxidant inlet port, said swirling annulus produced by said tangential velocity component of said oxidant in said oxidant flow path having generally the same direction of swirl as said swirling annulus produced by said oxidant swirl means.

3. The stored energy combustor of claim 1 wherein said oxidant directing means includes a tube leading from said source of oxidant to said housing, said tube having a discharge end arranged generally tangentially of said housing at a point radially outwardly of a longitudinal axis of said vessel, said tube directing oxidant from said source into said housing in such manner as to cause said oxidant flow path to be generally helical.

4. The stored energy combustor of claim 1 wherein said velocity controlling means includes a valve operatively associated with said oxidant directing means, said oxidant directing means including a tube leading from said source of oxidant to said housing and said tube having a discharge end communicating with said housing, said valve cooperating with said discharge end of said tube to control both the velocity and direction of oxidant entering said oxidant flow path.

5. A stored energy combustor, comprising:
  a vessel having a wall defining narrow, spaced apart inlet and outlet ends interconnected by a relatively wide combustion chamber;
  said vessel having a longitudinal axis extending from said inlet end through said combustion chamber to said outlet end thereof, said inlet end and outlet end being generally tubular extension of said vessel leading to and from said combustion chamber;
  an oxidant inlet port upstream of said combustion chamber for directing oxidant into said combustion chamber, said oxidant inlet port being concentric with said longitudinal axis of said vessel at said inlet end;
  fuel injection means in said tubular extension of said vessel leading to said combustion chamber, said fuel injection means having a discharge end for directing fuel from a source into said combustion chamber, said discharge end of said fuel injection means being concentric with said longitudinal axis of said vessel;
  said oxidant inlet port directing oxidant into said combustion chamber through said tubular extension of said vessel leading to said combustion chamber in surrounding relation to said fuel injection means;
  a housing substantially surrounding said vessel in spaced relation to said wall from said inlet end to said outlet end, said housing and said wall defining an oxidant flow path therebetween, said oxidant flow path being in communication with said oxidant inlet port at said inlet end of said vessel; and
  means for directing oxidant from a source into said oxidant flow path adjacent said upstream end of said vessel, said oxidant directing means being adapted to direct all of said oxidant into said oxidant flow path in such a manner as to have a substantial tangential velocity component as all of said oxidant flows from said outlet end to said inlet end of said vessel and into said oxidant inlet port, and including means for controlling the velocity of said oxidant entering said oxidant flow path dependent upon operating conditions.

6. The stored energy combustor of claim 5 including means upstream of said combustion chamber and said discharge end of said fuel injection means for swirling said oxidant in said tubular extension of said vessel leading to said combustion chamber, said tubular extension of said vessel leading to said combustion chamber directing oxidant in a swirling annulus into said combustion chamber outwardly of said discharge end of said fuel injection means.

7. The stored energy combustor of claim 6 wherein said tangential velocity component of said oxidant in said oxidant flow path causes said oxidant to flow in a swirling annulus from said outlet end toward said inlet end of said vessel upstream of said oxidant inlet port, said swirling annulus produced by said tangential velocity component in said oxidant flow path having generally the same direction of swirl as said swirling annulus produced by said oxidant swirling means.

8. The stored energy combustor of claim 5 wherein said fuel injection means comprises a fuel injector including a tube defining a fuel passageway extending in generally concentric relation to said longitudinal axis of said vessel, said tubular extension of said vessel leading to said combustion chamber directing oxidant into said combustion chamber outwardly of said fuel passageway defined by said tube at said discharge end thereof.

9. The stored energy combustor of claim 5 wherein said oxidant directing means includes a tube leading from said source of oxidant to said housing, said tube having a discharge end arranged generally tangentially of said housing at a point radially outwardly of said longitudinal axis of said vessel, said tube directing oxidant from said source into said housing in such manner as to cause said oxidant flow path to be generally helical.

10. The stored energy combustor of claim 5 wherein said velocity controlling means includes a valve operatively associated with said oxidant directing means, said oxidant directing means including a tube leading from said source of oxidant to said housing and said tube having a discharge end communicating with said housing, said valve cooperating with said discharge end of said tube to control both the velocity and direction of oxidant entering said oxidant flow path.

11. A stored energy combustor, comprising:
  a vessel having a wall defining narrow, spaced apart inlet and outlet ends interconnected by a relatively wide combustion chamber;
  said vessel having a longitudinal axis extending from said inlet end through said combustor chamber to said outlet end thereof; said inlet end and outlet end being generally tubular extensions of said vessel leading to and from said combustion chamber;
  an oxidant inlet port upstream of said combustion chamber for directing oxidant into said combustion chamber, said oxidant inlet port being concentric with said longitudinal axis of said vessel at said inlet end;
  fuel injection means in said tubular extension of said vessel leading to said combustion chamber, said fuel injection means having a discharge end for directing fuel from a source into said combustion chamber, said discharge end of said fuel injection means being concentric with said longitudinal axis of said vessel;
  said oxidant inlet port directing oxidant into said combustion chamber through said tubular extension of said vessel leading to said combustion chamber is surrounding relation to said fuel injection means;
  a housing substantially surrounding said vessel in spaced relation to said wall from said inlet end to said outlet end, said housing and said wall defining an oxidant flow path therebetween, said oxidant flow path being in communication with said oxidant inlet port at said inlet end of said vessel; and
  means for directing oxidant from a source into said oxidant flow path adjacent said upstream end of said vessel, said oxidant directing means being adapted to direct all of said oxidant into said oxidant flow path in such a manner as to have a substantial tangential velocity component as all of said oxidant flows from said outlet end to said inlet end of said vessel and into said oxidant inlet port, and including means for controlling the velocity of said oxidant entering said oxidant flow path dependent upon operating conditions;

said oxidant directing means including a tube leading from said source of oxidant to said housing and having a discharge end arranged generally tangentially of said housing, said discharge end being in communication with said oxidant flow path and being disposed at a point radially outwardly of said longitudinal axis of said vessel, said tube directing oxidant from said source through said discharge end into said oxidant flow path in such manner as to cause said oxidant to flow in a generally helical path;

said velocity controlling means including a valve for controlling the flow of oxidant from said source into said oxidant flow path, said valve being operatively associated with said tube at or upstream of said discharge end thereof, said valve cooperating with said tube in such manner as to control both velocity and direction of oxidant entering said oxidant flow path.

12. The stored energy combustor of claim 11 including means upstream of said combustion chamber and said discharge end of said fuel injection means for swirling said oxidant in said tubular extension of said vessel leading to said combustion chamber, said tubular extension of said vessel leading to said combustion chamber directing oxidant in a swirling annulus into said combustion chamber outwardly of said discharge end of said fuel injection means.

13. The stored energy combustor of claim 12 wherein said tangential velocity component of said oxidant in said oxidant flow path causes said oxidant to flow in a swirling annulus from said outlet end toward said inlet end of said vessel upstream of said oxidant inlet port, said swirling annuls produced by said tangential velocity component in said oxidant flow path having generally the same direction of swirl as said swirling annulus produced by said oxidant swirling means.

14. The stored energy combustor of claim 11 wherein said fuel injection means comprises a fuel injector including a tube defining a fuel passageway extending in generally concentric relation to said longitudinal axis of said vessel, said tubular extension of said vessel leading to said combustion chamber directing oxidant into said combustion chamber outwardly of said fuel passageway defined by said tube at said discharge end thereof.

15. The stored energy combustor of claim 11 wherein said valve comprises a flapper valve adapted to vary the cross-sectional area of said tube at or upstream of said discharge end of said tube, said source of oxidant being provided at a preselected pressure, said valve decreasing velocity by opening to increase the cross-sectional area and to increase velocity by closing to decrease the cross-sectional area at or upstream of said discharge end of said tube.

16. The stored energy combustor of claim 11 including a plurality of generally tangentially extending trip strips on an outer surface of said wall defining said vessel.

17. The stored energy combustor of claim 11 including a thermal barrier coating on an inner surface of said wall in at least the region of said combustion chamber.

18. The stored energy combustor of claim 11 wherein said tube is positioned at the outer periphery of said housing.

19. The stored energy combustor of claim 11 wherein said combustion chamber is generally spherical in shape.

20. The stored energy combustor of claim 11 wherein said combustion chamber is generally oblong in shape.

* * * * *